(12) United States Patent
Miyashiro et al.

(10) Patent No.: US 12,434,569 B2
(45) Date of Patent: Oct. 7, 2025

(54) CONTROL SYSTEM FOR STRADDLED ELECTRIC VEHICLE AND STRADDLED ELECTRIC VEHICLE

(71) Applicant: YAMAHA HATSUDOKI KABUSHIKI KAISHA, Iwata (JP)

(72) Inventors: Shidehiko Miyashiro, Shizuoka (JP); Yoshinori Matsuoka, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 178 days.

(21) Appl. No.: 18/498,653

(22) Filed: Oct. 31, 2023

(65) Prior Publication Data

US 2024/0198816 A1 Jun. 20, 2024

(30) Foreign Application Priority Data

Dec. 15, 2022 (JP) ................... 2022-200030

(51) Int. Cl.
*B60L 15/20* (2006.01)

(52) U.S. Cl.
CPC ....... *B60L 15/2054* (2013.01); *B60L 2200/12* (2013.01); *B60L 2240/423* (2013.01); *B60L 2250/24* (2013.01)

(58) Field of Classification Search
None
See application file for complete search history.

(56) References Cited

U.S. PATENT DOCUMENTS

| 8,505,673 | B2 | 8/2013 | Bowers |
| 9,387,764 | B2 * | 7/2016 | Matsuda .................. B60L 50/66 |
| 11,866,117 | B2 * | 1/2024 | Knitt ....................... B60L 50/60 |

FOREIGN PATENT DOCUMENTS

| EP | 2910401 B1 | 1/2020 |
| EP | 3730337 A1 | 10/2020 |
| EP | 2660093 B1 | 11/2021 |
| JP | 6946549 B2 | 10/2021 |

OTHER PUBLICATIONS

European Office Action dated Oct. 15, 2024, in the counterpart European patent application No. 23188923.9.

* cited by examiner

*Primary Examiner* — Todd Melton
(74) *Attorney, Agent, or Firm* — Rabin & Berdo, P.C.

(57) ABSTRACT

A control system for a straddled vehicle including an electric motor for driving the straddled vehicle, the electric motor being configured to generate a drive force and a regenerative brake force. The control system includes: a first operating member for controlling the drive force of the electric motor, a second operating member for reducing either the drive force or the regenerative brake force of the electric motor; a control device configured to control the drive force of the electric motor in accordance with an operation of the first operating member, and to reduce either the drive force or the regenerative brake force of the electric motor in accordance with an operation of the second operating member, and a load adjusting device adjusting an operating load acting on the second operating member based on an operating position of the second operating member.

11 Claims, 10 Drawing Sheets

CONTROL SYSTEM FOR STRADDLED ELECTRIC VEHICLE AND STRADDLED ELECTRIC VEHICLE

CROSS-REFERENCE TO RELATED APPLICATIONS

This application is based on, and claims priority from, Japanese Patent Application No. 2022-200030, filed on Dec. 15, 2022. The contents of the application is incorporated herein by reference.

BACKGROUND

Field of the Invention

The present invention relates to a control system for a straddled electric vehicle and also relates to a straddled electric vehicle.

Background Information

It has been conventionally disclosed that in a straddled electric vehicle including an electric motor as a drive source, a drive force of the electric motor is controlled through an operating member made in shape of a lever (see Publication of Japan Patent No. 6946549).

It has been demanded to enhance the operability of the operating member for controlling the drive force of the electric motor in the straddled electric vehicle.

It is an object of the present invention to provide a control system for a straddled electric vehicle, whereby an operating member for controlling a drive force of an electric motor can be enhanced in operability.

SUMMARY

A control system for a straddled electric vehicle according to an aspect of the present invention is a control system for a straddled electric vehicle including an electric motor for driving a vehicle. The control system for a straddled electric vehicle includes a first operating member, a second operating member, a control device, and a load adjusting device. The first operating member is an operating member for controlling a drive force of the electric motor. The second operating member is an operating member for reducing either the drive force or a regenerative brake force of the electric motor. The control device controls the drive force of the electric motor in accordance with operating the first operating member and reduces either the drive force or the regenerative brake force of the electric motor in accordance with operating the second operating member. The load adjusting device makes an operating load acting on the second operating member vary in accordance with an amount of increasing either the drive force or the regenerative brake force of the electric motor based on an operating amount of the second operating member.

In the control system for a straddled electric vehicle according to the present aspect, the load adjusting device makes the operating load acting on the second operating member vary in accordance with the amount of reducing either the drive force or the regenerative brake force of the electric motor based on the operating amount of the second operating member. In other words, the operating load acting on the second operating member, corresponding to the operating amount of the second operating member, varies with the reduction amount of either the drive force or the regenerative brake force of the electric motor; hence, an operator is more likely to feel a sense of operating the second operating member than, for instance, a configuration that the operating load is constant. As a result, the second operating member can be enhanced in operability.

The second operating member may be operable in an operating range defined between a first position, corresponding to an initial position, and a second position located farthest from the first position. The operating range may include a progressive reduction range defined between the first position and the second position. The control device may gradually reduce either the drive force or the regenerative brake force of the electric motor with proximity of the second operating member to the second position in the progressive reduction range. The load adjusting device may gradually increase the operating load acting on the second operating member with proximity of the second operating member to the second position in the progressive reduction range. In this case, the reduction amount of either the drive force or the regenerative brake force of the electric motor increases with increase in operating load; hence, the second operating member is further enhanced in operability.

The operating range may include a blockage range defined between the progressive reduction range and the second position. The control device may block either the drive force or the regenerative brake force of the electric motor when the operating amount of the second operating member falls in the blockage range. The load adjusting device may adjust the operating load acting on the second operating member in the blockage range to be less than a maximum load acting on the second operating member in the progressive reduction range. In this case, the operator can feel a sense that the operating range of the second operating member has transitioned from the progressive reduction range to the blockage range; hence, the second operating member is further enhanced in operability.

The load adjusting device may gradually reduce the operating load acting on the second operating member with proximity of the second operating member to the second position in the blockage range. In this case, it is made easier for the operator to feel the sense that the operating range of the second operating member has transitioned from the progressive reduction range to the blockage range.

The operating range may further include a free play range defined between the first position and the progressive reduction range. The control device may not reduce either the drive force or the regenerative brake force of the electric motor when the operating amount of the second operating member falls in the free play range. In this case, the free play range can inhibit occurrence of erroneously operating the second operating member.

The load adjusting device may make the operating load acting on the second operating member vary such that an increase rate of the operating load acting on the second operating member becomes greater in the progressive reduction range than in the free play range. In this case, the operator can feel a sense that the second operating member has transitioned from the free play range to the blockage range; hence, the second operating member is further enhanced in operability.

The control system for a straddled electric vehicle may further include a steering device. The steering device may include a first handle grip, a second handle grip, and a brake lever. The first operating member may be disposed on the first handle grip. The second handle grip may be disposed on an opposite side of the first handle grip with reference to a center in a vehicle width direction. The brake lever may be is disposed directly in front of the second handle grip. The second operating member may be disposed on the brake lever. In this case, the operator can be inhibited from releasing the thumb of a hand operating the second operating member from leaving the second handle grip. In other words, while holding the second handle grip, the operator is enabled to put a first finger and a second finger different from the first finger on the brake lever and the second operating member, respectively. Besides, the operator is enabled to operate the second operating member together with the brake lever.

The second operating member may be an operating member made in shape of a lever. In this case, the second operating member can be enhanced in operability.

The control device may control the drive force of the electric motor to become greater in magnitude than a drive force set in accordance with an operating amount of the first operating member when the second operating member is operated from either the blockage range or the progressive reduction range to the first position at an operating speed of greater than or equal to a predetermined threshold while the first operating member is operated. In this case, when the second operating member is momentarily returned to the first position from the blockage range, for instance, a large drive force can be obtained momentarily; hence, a variety of traveling aspects can be realized for the straddled electric vehicle.

A straddled electric vehicle according to another aspect of the present invention includes an electric motor for driving a vehicle and the control system described above. Accordingly, it is made possible to provide the straddled electric vehicle including the control system described above.

Overall, according to the present invention, an operating member for controlling a drive force of an electric motor can be enhanced in operability in a control system for a straddled electric vehicle.

DETAILED DESCRIPTION OF EMBODIMENTS

Figure 1:
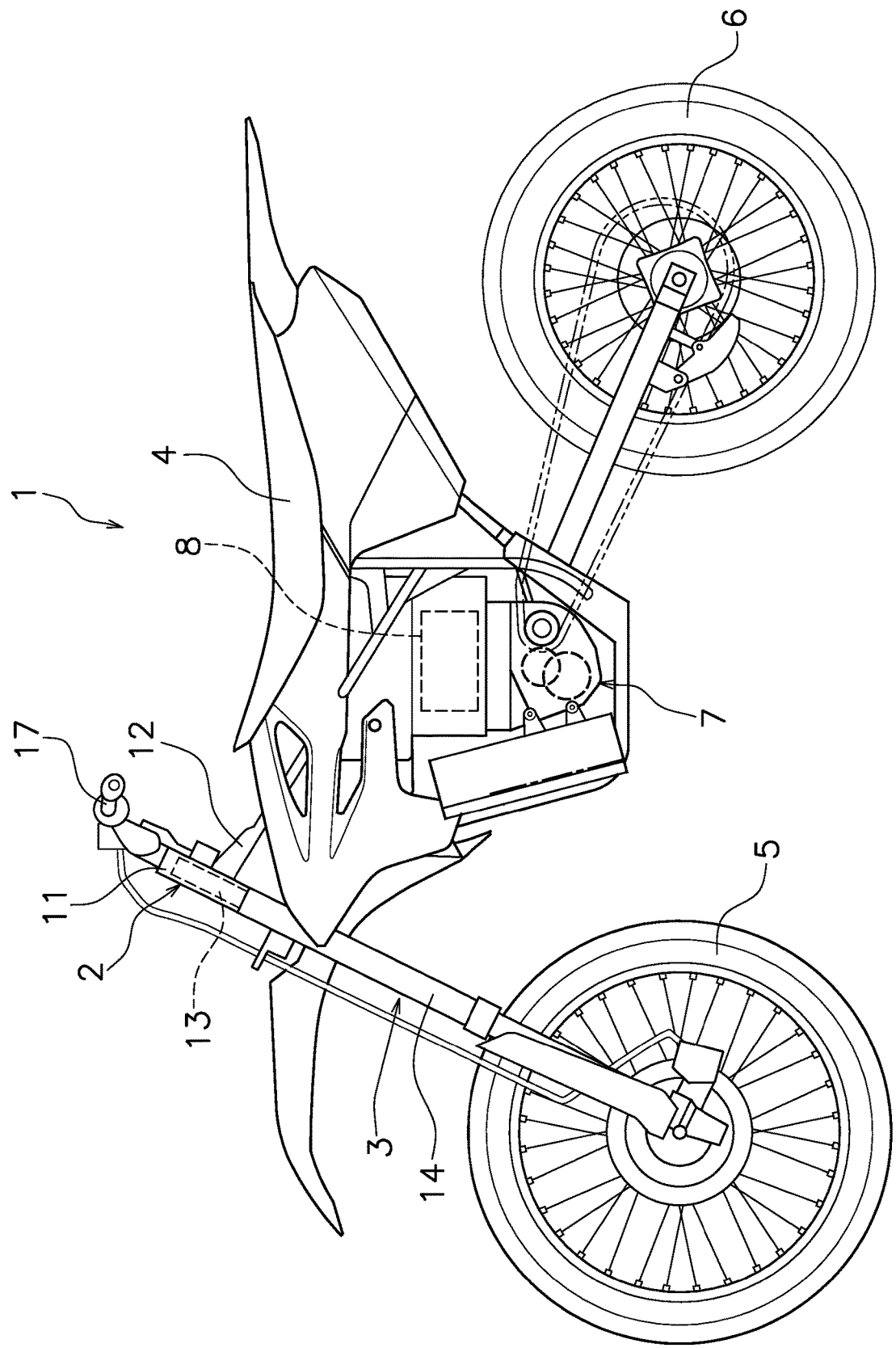
FIG. 1 is a side view of a straddled electric vehicle.

A control system for a straddled electric vehicle according to a preferred embodiment will be hereinafter explained with reference to drawings. FIG. 1 is a side view of a straddled electric vehicle 1 including a control system 10 according to the preferred embodiment. The straddled electric vehicle 1 is a two-wheeled electric vehicle. The straddled electric vehicle 1 may be another type of electric vehicle, for instance, a four-wheeled electric vehicle, a three-wheeled electric vehicle, electric snowmobile, or so forth.

The straddled electric vehicle 1 includes a vehicle body frame 2, a steering device 3, a seat 4, a front wheel 5, a rear wheel 6, an electric motor 7, and a battery 8.

The vehicle body frame 2 includes a head pipe 11 and a main frame 12. The head pipe 11 is disposed in the middle of the vehicle in a vehicle width direction. The main frame 12 is connected to the head pipe 11. The main frame 12 extends rearward from the head pipe 11.

Figure 2:
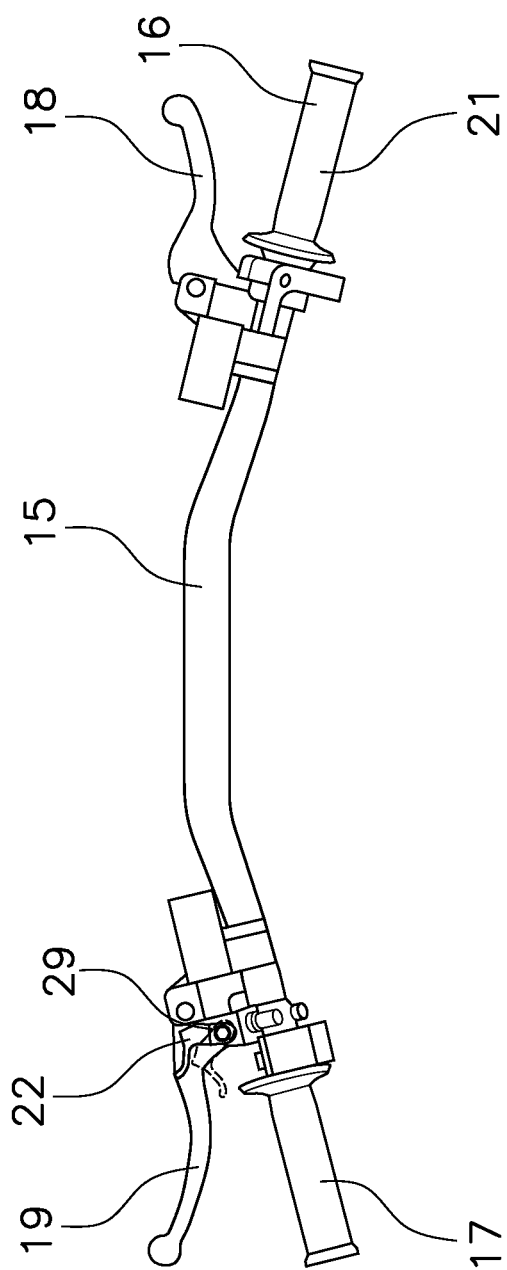
FIG. 2 is a plan view of part of a steering device.

The steering device 3 is supported by the head pipe 11 so as to be turnable. The steering device 3 supports the front wheel 5 such that the front wheel 5 is made rotatable. As shown in FIGS. 1 and 2, the steering device 3 includes a steering shaft 13, a front fork 14, a handlebar 15, a first handle grip 16, a second handle grip 17, a first brake lever 18, and a second brake lever 19.

The steering shaft 13 is inserted into the head pipe 11. The front fork 14 is connected to the steering shaft 13 and supports the front wheel 5 such that the front wheel 5 is made rotatable.

The handlebar 15 extends in the vehicle width direction. The handlebar 15 is fixed to the steering shaft 13. The first handle grip 16 is disposed on the right of the center in the vehicle width direction. The second handle grip 17 is disposed on the opposite side of the first handle grip 16 with reference to the center in the vehicle width direction. In other words, the second handle grip 17 is disposed on the left of the center in the vehicle width direction.

The first brake lever 18 is disposed directly in front of the first handle grip 16. The first brake lever 18 is an operating member for controlling braking of the front wheel 5. The second brake lever 19 is disposed directly in front of the second handle grip 17. The second brake lever 19 is an operating member for controlling braking of the rear wheel 6.

The seat 4 is disposed directly behind the head pipe 11. The front wheel 5 is supported by the front fork 14 so as to be rotatable. The rear wheel 6 is supported by the main frame 12 through a swing arm so as to be rotatable. The rear wheel 6 is rotated by a drive force generated by the electric motor 7.

The electric motor 7 is attached to the vehicle body frame 2. The electric motor 7 is connected to the rear wheel 6 through, for instance, a power transmission path composed of a reducer, a chain, and so forth. The electric motor 7 is driven by electric power supplied thereto from the battery 8. The electric motor 7 is, for instance, a three-phase alternating current motor. The electric motor 7 functions as a power generator caused to generate electric power by a rotational force of the rear wheel 6 in deceleration of the vehicle.

The battery 8 is disposed directly above the electric motor 7. The battery 8 supplies the electric power to the electric motor 7.

Figure 3:
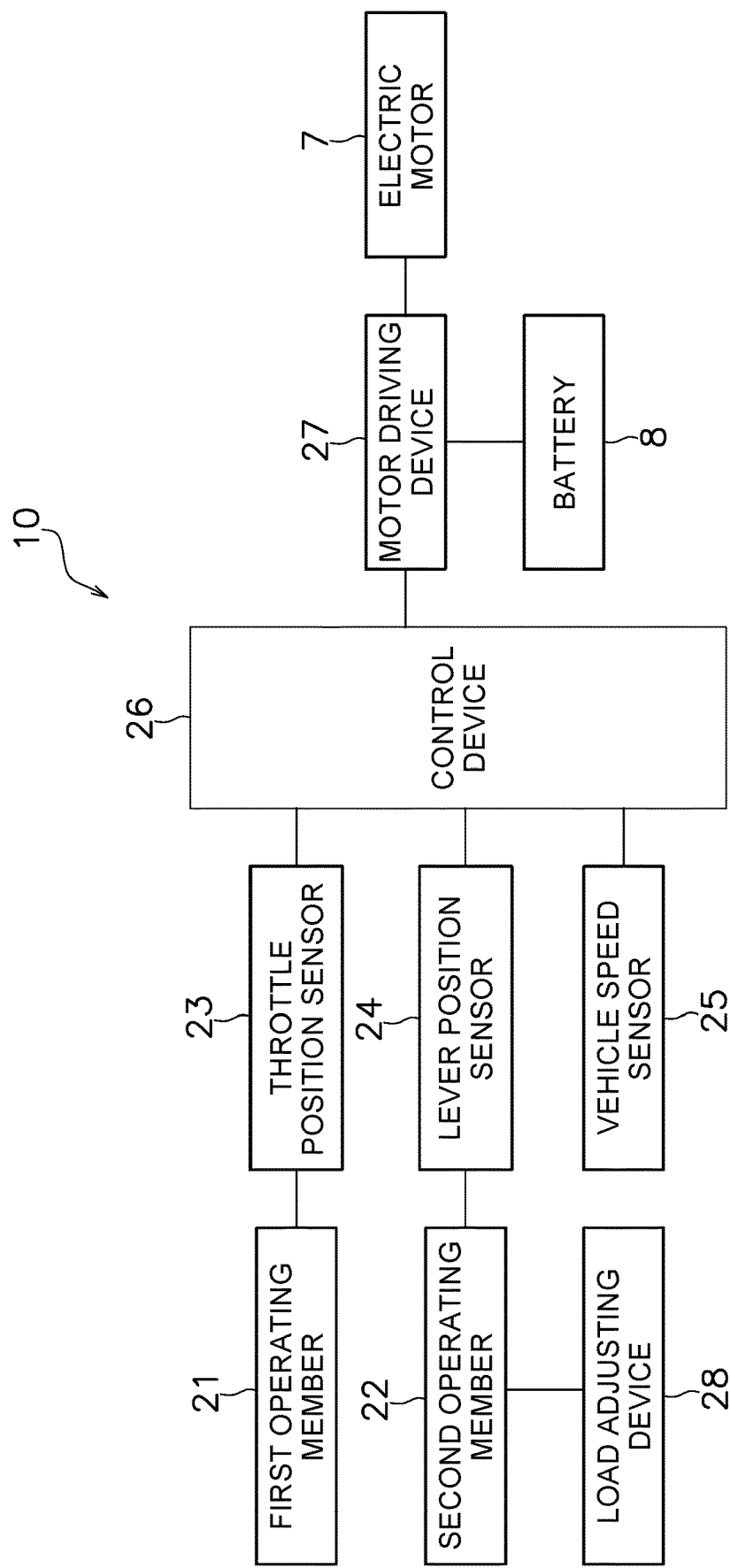
FIG. 3 is a block diagram of a control system.

FIG. 3 is a block diagram of the control system 10. The control system 10 includes a first operating member 21, a second operating member 22, a throttle position sensor 23, a lever position sensor 24, a vehicle speed sensor 25, a control device 26, a motor driving device 27, and a load adjusting device 28.

The first operating member 21 is disposed on the first handle grip 16. The first operating member 21 is an operating member for controlling the drive force of the electric motor 7 (a torque outputted from the electric motor 7). The first operating member 21 is a throttle grip twistable with respect to the handlebar 15. The first operating member 21 is unitarily twistable with the first handle grip 16.

The second operating member 22 is an operating member for reducing either the drive force or a regenerative brake force of the electric motor 7. The second operating member 22 is an operating member made in shape of a lever. The second operating member 22 is disposed on the second brake lever 19. The second operating member 22 is disposed directly above the second brake lever 19. The second operating member 22 is supported to be pivotable by a pivot shaft 29 extending approximately in a vehicle up-and-down direction.

The second operating member 22 is operable in an operating range defined between a first position (depicted with solid line in FIG. 2) and a second position (depicted with broken line in FIG. 2). The first position corresponds to the initial position of the second operating member 22, whereas the second position corresponds to a position remote farthest from the first position. The second operating member 22 is operable to pivot between the first and second positions. The second operating member 22 is urged to the first position by, for instance, a torsion spring 30 (see FIG. 7).

Figure 4:
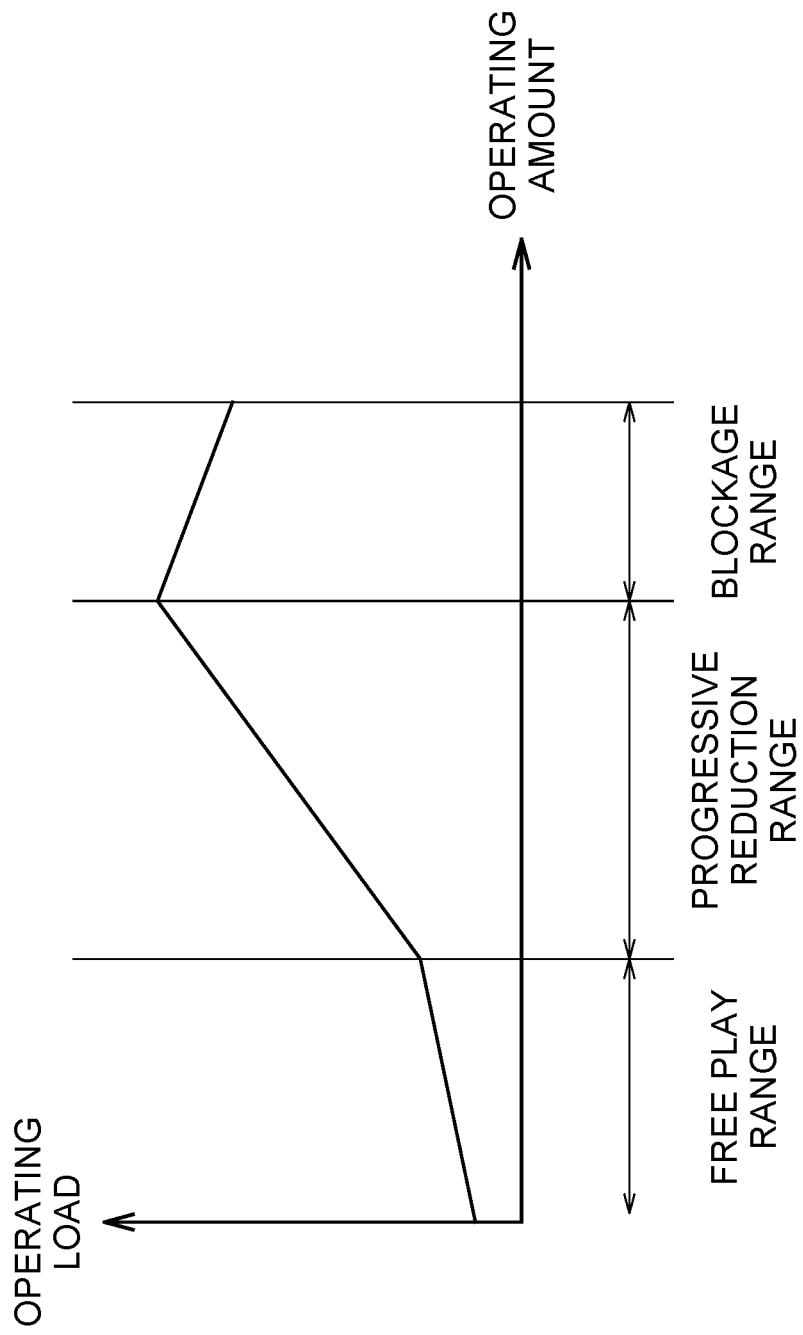
FIG. 4 is a chart exemplifying a relation between an operating amount of a second operating member and an operating load acting on the second operating member.

FIG. 4 is a chart exemplifying a relation between the operating amount of the second operating member 22 and the operating load acting on the second operating member 22. As shown in FIG. 4, in the present preferred embodiment, the operating range of the second operating member 22 is divided into three sub-ranges. When described in detail, the operating range of the second operating member 22 is composed of a free play range, a progressive reduction range, and a blockage range.

The free play range is a range defined between the first position and a progressive reduction position. The progressive reduction range is a range defined between the free play range and the blockage range. The blockage range is a range defined between the progressive reduction range and the second position. The operating amount of the second operating member 22 gradually increases with proximity of the second operating member 22 to the second position. The operating amount of the second operating member 22 corresponding to the progressive reduction range is greater than that corresponding to the free play range. The operating amount of the second operating member 22 corresponding to the blockage range is greater than that corresponding to the progressive reduction range.

The throttle position sensor 23 detects the operating amount (twisted position) of the first operating member 21 and outputs a signal to the control device 26 in accordance with the operating amount of the first operating member 21. The throttle position sensor 23 is, for instance, a potentiometer.

The lever position sensor 24 detects the operating amount (position) of the second operating member 22 and outputs a signal to the control device 26 in accordance with the operating amount of the second operating member 22. The lever position sensor 24 is, for instance, a potentiometer.

The vehicle speed sensor 25 detects the speed of the vehicle and outputs a signal to the control device 26 in accordance with the vehicle speed.

The control device 26 controls the drive force of the electric motor 7 in accordance with operating the first operating member 21. The control device 26 performs regenerative control for the electric motor 7 in deceleration of the vehicle. The control device 26 reduces either the drive force or the regenerative brake force of the electric motor 7 in accordance with operating the second operating member 22. The control device 26 controls the drive force of the electric motor 7 in accordance with the signal outputted from the throttle position sensor 23. The control device 26 reduces either the drive force or the regenerative brake force of the electric motor 7 in accordance with the signal outputted from the lever position sensor 24.

When the second operating member 22 is operated while the drive force of the electric motor 7 is controlled in accordance with operating the first operating member 21, the control device 26 reduces the drive force of the electric motor 7 in accordance with the operating amount of the second operating member 22.

When the second operating member 22 is operated while the vehicle decelerates by stopping operating the first operating member 21, the control device 26 reduces the regenerative brake force of the electric motor 7 in accordance with the operating amount of the second operating member 22.

Figure 5:
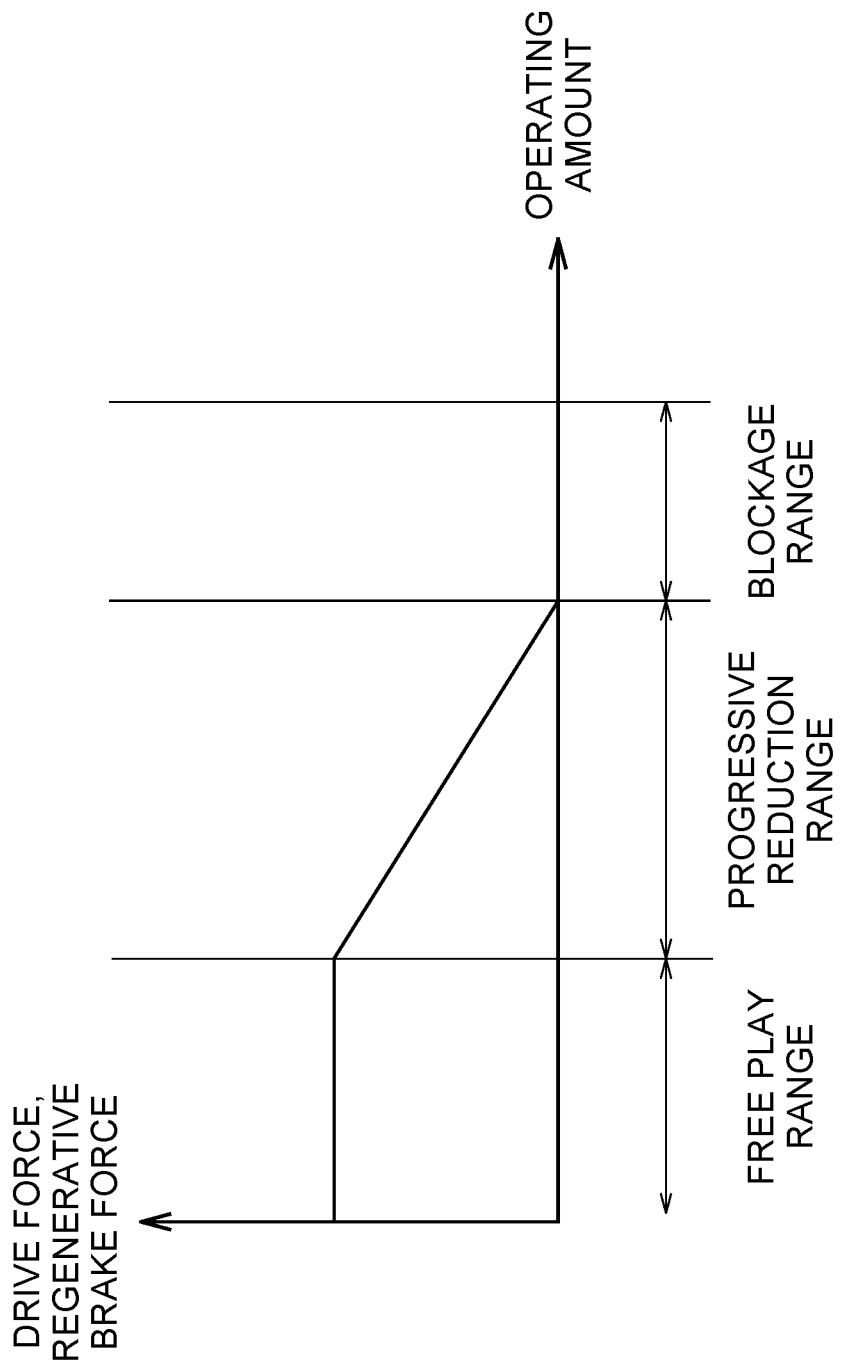
FIG. 5 is a chart exemplifying a relation between the operating amount of the second operating member and either a drive force or a regenerative brake force.

FIG. 5 is a chart exemplifying a relation between the operating amount of the second operating member 22 and either the drive force or the regenerative brake force of the electric motor 7. As shown in FIG. 5, when the operating amount of the second operating member 22 falls in the free play range, the control device 26 does not reduce either the drive force or the regenerative brake force of the electric motor 7. When the operating amount of the second operating member 22 falls in the progressive reduction range, the control device 26 reduces either the drive force or the regenerative brake force of the electric motor 7. The control device 26 gradually reduces either the drive force or the regenerative brake force of the electric motor 7 with proximity of the second operating member 22 to the second position in the progressive reduction range. In other words, the control device 26 gradually reduces either the drive force or the regenerative brake force of the electric motor 7 with increase in the operating amount of the second operating member 22 in the progressive reduction range. When the operating amount of the second operating member 22 falls in the blockage range, the control device 26 blocks either the drive force or the regenerative brake force of the electric motor 7.

Figure 6:
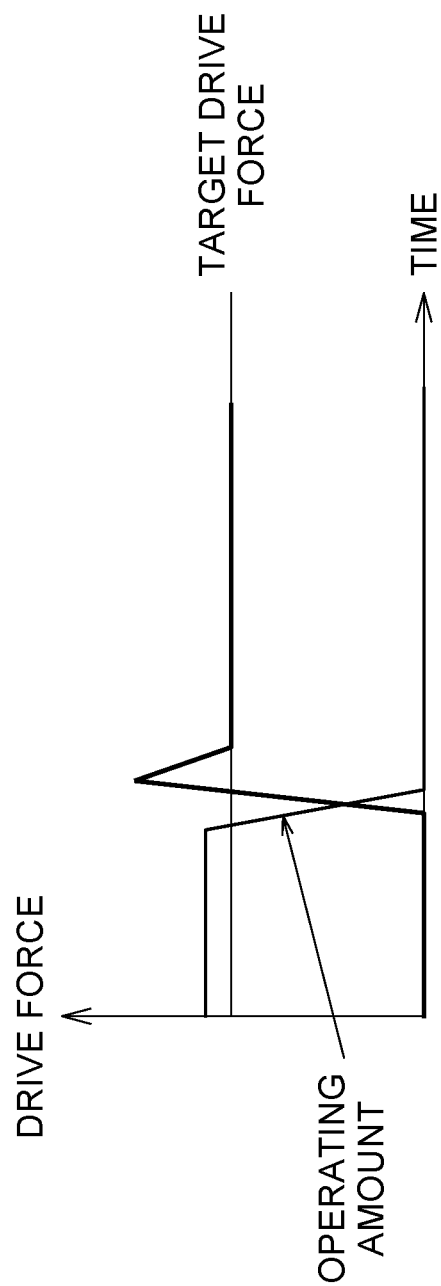
FIG. 6 is a chart exemplifying a relation between a drive force and an operating speed of the second operating member.

FIG. 6 is a chart exemplifying a relation between the operating speed of the second operating member 22 and the drive force of the electric motor 7. When the first operating member 21 is operated, and simultaneously, the second operating member 22 is operated from either the blockage range or the progressive reduction range to the first position at an operating speed of greater than or equal to a predetermined threshold, the control device 26 controls the drive force of the electric motor 7 to become greater in magnitude than a target drive force, that is, a drive force set in accordance with the operating amount of the first operating member 21. For example, when the first operating member 21 is operated during traveling, and simultaneously, the operating amount of the second operating member 22 falls in the blockage range, the drive force of the electric motor 7, set in accordance with the operating amount of the first operating member 21, is not transmitted to the rear wheel 6. At this time, when the second operating member 22 is momentarily returned to the first position, the control device 26 controls the drive force of the electric motor 7 to become greater in magnitude than the target drive force for a predetermined period of time. For example, when the first operating member 21 is operated during traveling, and simultaneously, the operating amount of the second operating member 22 falls in the progressive reduction range, if the second operating member 22 is momentarily returned to the first position, the control device 26 controls the drive force of the electric motor 7 to become greater in magnitude than the target drive force for a predetermined period of time. The condition that the second operating member 22 is momentarily returned to the first position refers to, for instance, a condition that the second operating member 22 is returned to the first position by an urging force exerted thereon by the torsion spring 30 when an operator releases a finger of the left hand (see FIG. 10) from the second operating member 22 that has been operated to either the blockage range or the progressive reduction range by the finger.

The motor driving device 27 uses the electric power stored in the battery 8 so as to supply the electric motor 7 with electric power, the magnitude of which depends on a command value inputted thereto from the control device 26. The motor driving device 27 includes an inverter (not shown in the drawings). The motor driving device 27 converts direct current supplied thereto from the battery 8 into alternating current and supplies the alternating current to the electric motor 7. The motor driving device 27 causes the electric motor 7 to generate electric power in deceleration of the vehicle so as to supply the battery 8 and one or more other electric components with electric power, the magnitude of which depends on the command value inputted thereto from the control device 26. The motor driving device 27 includes a converter. In deceleration of the vehicle, the motor driving device 27 converts direct current obtained from the electric motor 7 into alternating current and supplies the alternating current to the battery 8 and the one or more other electric components.

The load adjusting device 28 makes the operating load acting on the second operating member 22 vary in accordance with an amount of reducing either the drive force or the regenerative brake force of the electric motor 7 based on the operating amount of the second operating member 22. It should be noted that in the following explanation, the operating load acting on the second operating member 22 will be simply referred to as the operating load. In the present preferred embodiment, the operating load corresponds to the sum of the urging force exerted by the torsion spring 30 and a moment of force exerted by the load adjusting device 28 on the second operating member 22.

As shown in FIG. 4, the load adjusting device 28 gradually increases the operating load with proximity of the second operating member 22 to the second position in the free play range. In other words, the load adjusting device 28 gradually increases the operating load with increase in the operating amount of the second operating member 22 in the free play range.

The load adjusting device 28 gradually increases the operating load with proximity of the second operating member 22 to the second position in the progressive reduction range. In other words, the load adjusting device 28 gradually increases the operating load with increase in the operating amount of the second operating member 22 in the progressive reduction range. As shown in FIG. 4, the load adjusting device 28 makes the operating load vary such that an increase rate of the operating load becomes greater in the progressive reduction range than in the free play range. When described in detail, the load adjusting device 28 makes the operating load vary such that a ratio of the increment in the operating load to that in the operating amount of the second operating member 22 becomes greater in the progressive reduction range than in the free play range.

The load adjusting device 28 adjusts the operating load in the blockage range to be less than the maximum operating load in the progressive reduction range. In other words, the load adjusting device 28 reduces the operating load when the operating amount of the second operating member 22 exceeds the progressive reduction range. In the present preferred embodiment, the load adjusting device 28 gradually reduces the operating load acting on the second operating member 22 with proximity of the second operating member 22 to the second position in the blockage range.

Figure 7:
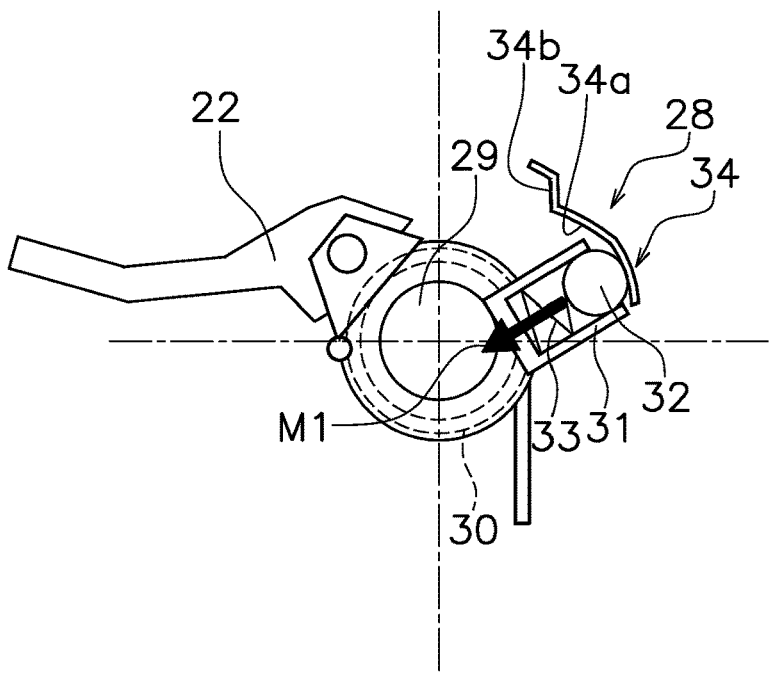
FIG. 7 is a schematic diagram for explaining a load adjusting device.
Figure 8:
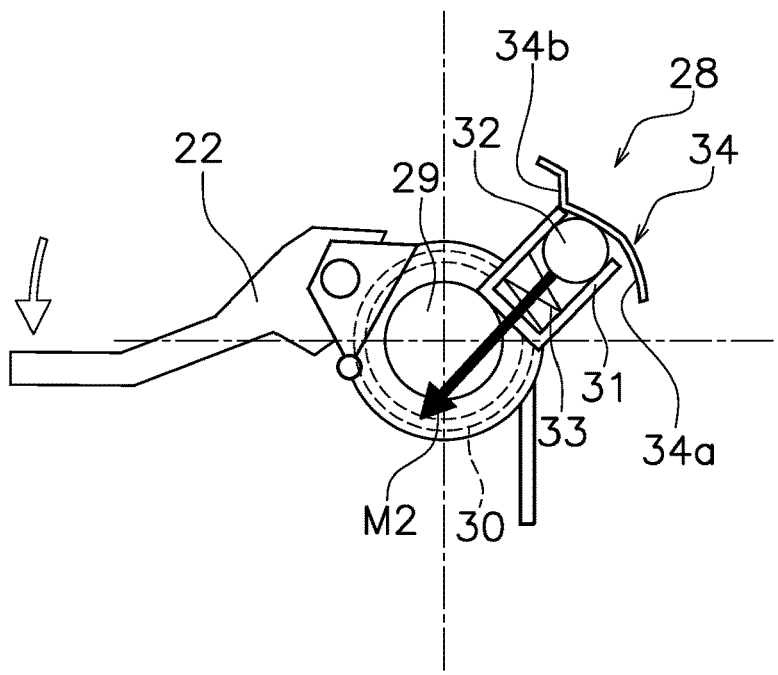
FIG. 8 is another schematic diagram for explaining the load adjusting device.
Figure 9:
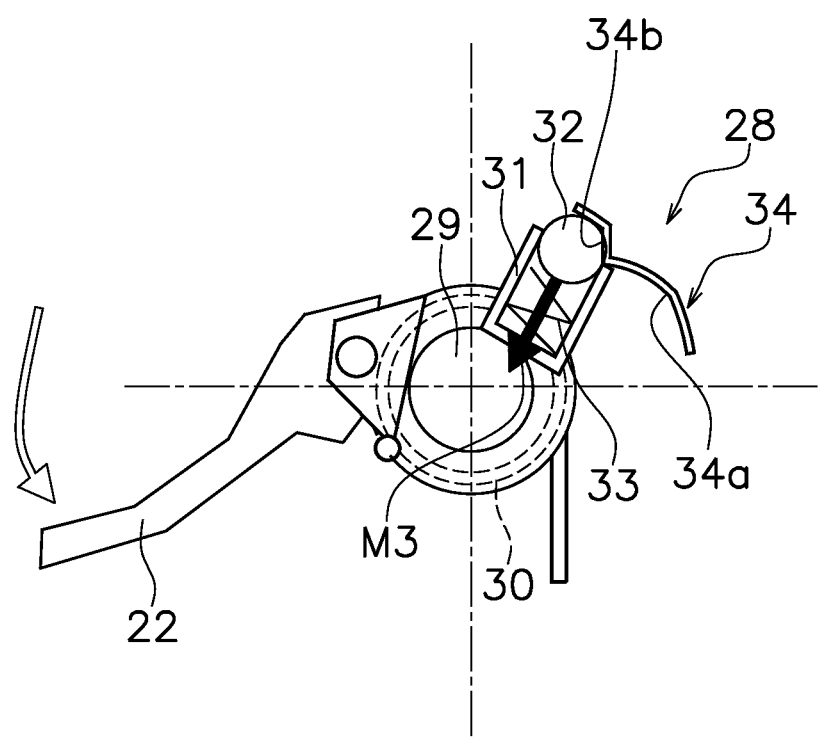
FIG. 9 is yet another schematic diagram for explaining the load adjusting device.

FIGS. 7 to 9 are schematic diagrams for explaining the load adjusting device 28. FIG. 7 shows a condition that the second operating member 22 is located in the free play range, FIG. 8 shows a condition that the second operating member 22 is located in the progressive reduction range, and FIG. 9 shows a condition that the second operating member 22 is located in a blockage position.

The load adjusting device 28 includes an accommodation portion 31, a ball 32, a coil spring 33, and a cam 34. The accommodation portion 31, the ball 32, and the coil spring 33 are unitarily moved with the second operating member 22. The accommodation portion 31 is fixed to the second operating member 22. The ball 32 is accommodated in part in the accommodation portion 31. The ball 32 contacts with the cam 34. The coil spring 33 is accommodated in the accommodation portion 31. The coil spring 33 urges the ball 32 against the cam 34.

The cam 34 is configured such that a force, exerted by the cam 34 on the ball 32 to press the ball 32, varies in magnitude in accordance with pivoting of the second operating member 22. The force, exerted by the cam 34 on the ball 32 to press the ball 32, acts in a direction that the operating load acting on the second operating member 22 increases. When described in detail, the force, exerted by the cam 34 on the ball 32 to press the ball 32, acts as the moment of force by which the second operating member 22 is pivoted clockwise in FIGS. 7 to 9.

The cam 34 includes a first cam surface 34a and a second cam surface 34b. The first cam surface 34a is configured to gradually increase the operating load with proximity of the second operating member 22 from the first position to the blockage range. The second cam surface 34b is disposed in adjacent to the first cam surface 34a. The ball 32 contacts with the first cam surface 34a when the second operating member 22 is located in the free play range and the progressive reduction range. The ball 32 contacts with the second cam surface 34b when the second operating member 22 is located in the blockage range.

As shown in FIGS. 7 and 8, a moment of force M2 is greater in magnitude than a moment of force M1. The moment of force M2 is exerted by the load adjusting device 28 to pivot the second operating member 22 clockwise in the progressive reduction range, whereas the moment of force M1 is exerted by the load adjusting device 28 to pivot the second operating member 22 clockwise in the free play range. The moment of force M2 gradually increases with proximity of the second operating member 22 to the second position.

As shown in FIG. 9, a moment of force M3 is less in magnitude than the moment of force M2. The moment of force M3 is exerted by the load adjusting device 28 to pivot the second operating member 22 clockwise when the ball 32 is moved from the first cam surface 34a to the second cam surface 34b, namely, when the second operating member 22 is moved from the progressive reduction position to the blockage position. It should be noted that the magnitude of the operating load in the blockage range is set such that the second operating member 22 is enabled to momentarily return to the first position against the operating load when the operator stops operating the second operating member 22. Besides, when the second operating member 22 is momentarily returned to the first position from the blockage range as a result of releasing the left hand of the operator from the second operating member 22, the control device 26 controls the electric motor 7 to output, for a predetermined period of time, a drive force greater in magnitude than the target drive force set in correspondence to the torque command value corresponding to the operating amount of the first operating member 21 and rotational speed of the electric motor 7.

In the control system 10 according to the present aspect, the load adjusting device 28 makes the operating load acting on the second operating member 22 vary in accordance with the amount of reducing either the drive force or the regenerative brake force of the electric motor 7 based on the operating amount of the second operating member 22. In other words, the operating load acting on the second operating member 22, corresponding to the operating amount of the second operating member 22, varies with the reduction amount of either the drive force or the regenerative brake force of the electric motor 7; hence, the operator is more likely to feel a sense of operating the second operating member 22 than, for instance, a configuration that the operating load is constant. As a result, the second operating member 22 can be enhanced in operability.

The load adjusting device 28 adjusts the operating load in the blockage range to be less in magnitude than the maximum operating load in the progressive reduction range; hence, the operator can feel a sense that the operating range of the second operating member 22 has transitioned from the progressive reduction range to the blockage range.

The load adjusting device 28 makes the operating load vary such that the increase rate of the operating load becomes greater in the progressive reduction range than in the free play range; hence, the operator can feel a sense that the operating range of the second operating member 22 has transitioned from the free play range to the progressive reduction range.

Figure 10:
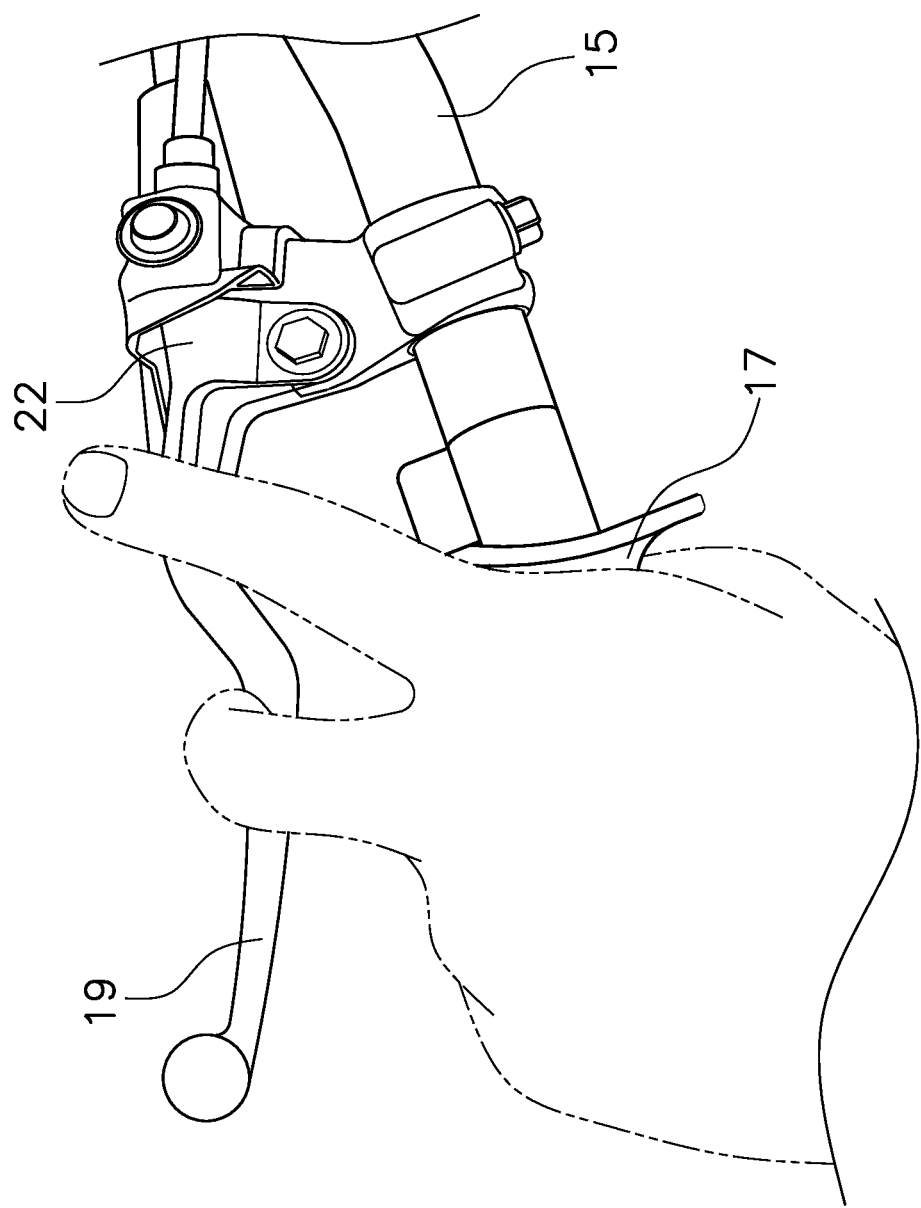
FIG. 10 is a diagram schematically showing a state of a hand in operation of the second operating member.
Figure 11:
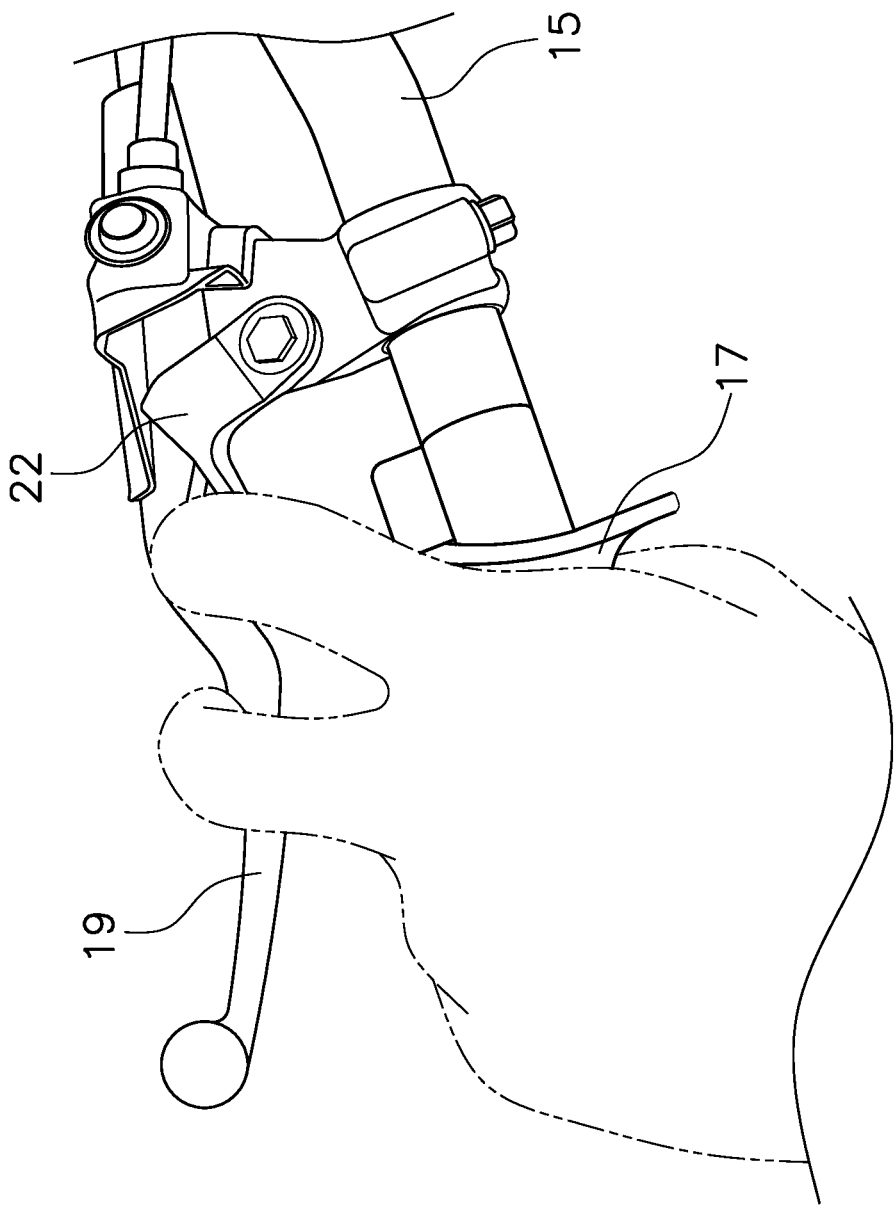
FIG. 11 is a diagram schematically showing another state of the hand in operation of the second operating member.

The second operating member 22 is an operating member made in shape of a lever and is disposed on the second brake lever 19. Because of this, as shown in FIGS. 10 and 11, while holding the second handle grip 17 with the thumb of the left hand, the operator is enabled to operate the second operating member 22 with the index finger hooked thereon and operate the second brake lever 19 with the middle finger hooked thereon. Besides, the operator is enabled to operate the second operating member 22 together with the second brake lever 19.

One preferred embodiment of the present invention has been explained above. However, the present invention is not limited to the preferred embodiment described above, and a variety of changes can be made without departing from the gist of the present invention.

The first operating member 21 may be made in form of a lever, button, accelerator pedal, or so forth. The second operating member 22 may be made in form of a button, twistable grip, foot lever operable by either foot of the operator, or so forth.

The load adjusting device 28 may be changed in configuration. The cam 34 may be changed in positional arrangement and/or shape. The load adjusting device 28 may be configured to make the operating load acting on the second operating member 22 vary with an electric configuration.

REFERENCE SIGNS LIST

1 Straddled electric vehicle
3 Steering device
16 First handle grip
17 Second handle grip
19 Second brake lever (exemplary brake lever)
21 First operating member
22 Second operating member
26 Control device
28 Load adjusting device

What is claimed is:

1. A control system for a straddled vehicle including an electric motor for driving the straddled vehicle, the electric motor being configured to generate a drive force and a regenerative brake force, the control system comprising:
   a first operating member for controlling the drive force of the electric motor;
   a second operating member for reducing either the drive force or the regenerative brake force of the electric motor;
   a control device configured to
      control the drive force of the electric motor in accordance with an operation of the first operating member, and
      reduce either the drive force or the regenerative brake force of the electric motor in accordance with an operation of the second operating member; and
   a load adjusting device adjusting an operating load acting on the second operating member based on an operating position of the second operating member.

2. The control system for a straddled vehicle according to claim 1, wherein
   the second operating member is operable in an operating range defined between a first position and a second position, the first position corresponding to an initial position of the second operating member, the second position corresponding to the operation position of the second operating member farthest from the first position,
   the operating position of the second operating member further includes a third position and a fourth position, both of which are located between the first position and the second position, the operating range includes a progressive reduction range defined between the third position and the fourth position,
   the control device gradually reduces either the drive force or the regenerative brake force of the electric motor with proximity of the second operating member to the second position, when the operating position of the second operating member is in the progressive reduction range, and
   the load adjusting device gradually increases the operating load acting on the second operating member with the proximity of the second operating member to the second position, when the operating position of the second operating member is in the progressive reduction range.

3. The control system for a straddled vehicle according to claim 2, wherein
   the operating range of the second operating member further includes a blockage range defined between the fourth position and the second position, the control device blocks either the drive force or the regenerative brake force of the electric motor when the operating position of the second operating member is in the blockage range, and the load adjusting device adjusts the operating load acting on the second operating member, when the operating position of the second operating member is in the blockage range, to be less than a maximum load acting on the second operating member when the operating position of the second operating member is in the progressive reduction range.

4. The control system for a straddled vehicle according to claim 3, wherein the load adjusting device gradually reduces the operating load acting on the second operating member with the proximity of the second operating member to the second position, when the operating position of the second operating member is in the blockage range.

5. The control system for a straddled vehicle according to claim 3, wherein the control device controls the drive force of the electric motor to become greater in magnitude than a drive force set in accordance with an operating amount of the first operating member, when the second operating member is operated from either the blockage range or the progressive reduction range to the first position at an operating speed of greater than or equal to a predetermined threshold while the first operating member is operated.

6. The control system for a straddled vehicle according to claim 2, wherein the operating range further includes a free play range that is located between the first position and the third position, and the control device does not reduce the drive force or the regenerative brake force of the electric motor when the operating position of the second operating member is in the free play range.

7. The control system for a straddled vehicle according to claim 6, wherein the load adjusting device adjusts the operating load acting on the second operating member, such that an increase rate of the operating load acting on the second operating member is greater when the operating position of the second operating member is in the progressive reduction range than in the free play range.

8. The control system for a straddled vehicle according to claim 1, wherein the second operating member is operable in an operating range defined between a first position and a second position, the first position corresponding to an initial position of the second operating member, the second position corresponding to the operation position of the second operating member farthest from the first position, the operating position of the second operating member further includes a third position and a fourth position, both of which are located between the first position and the second position, the operating range includes a free play range and a progressive reduction range, the free play range being defined between the first position and the third position, the progressive reduction range being defined between the third position and the fourth position, the control device does not reduce the drive force or the regenerative brake force of the electric motor when the operating position of the second operating member is in the free play range, and reduces either the drive force or the regenerative brake force of the electric motor when the operating position of the second operating member is in the progressive reduction range, and the load adjusting device adjusts the operating load acting on the second operating member, such that an increase rate of the operating load acting on the second operating member is greater when the operating position of the second operating member is in the progressive reduction range than in the free play range.

9. The control system for a straddled vehicle according to claim 1, further comprising:

a steering device including:

a first handle grip having the first operating member disposed thereon, a second handle grip disposed on an opposite side of the first handle grip with reference to a center of the straddled vehicle in a width direction thereof, and a brake lever disposed directly in front of the second handle grip, wherein the second operating member is disposed on the brake lever.

10. The control system for a straddled vehicle according to claim 1, wherein the second operating member is of a shape of a lever.

11. A straddled vehicle comprising:
an electric motor for driving the straddled vehicle; and
the control system recited in claim 1.

* * * * *